United States Patent Office 3,433,122
Patented Mar. 18, 1969

3,433,122
DEVICE FOR MACHINE TOOLS
Otto Wachter, Zizishausen, and Gerd Lorber, Nurtingen, Germany, assignors to Trumpf & Co., Stuttgart-Weilimdorf, Germany
Filed Oct. 19, 1966, Ser. No. 587,707
Claims priority, application Germany, Oct. 27, 1965, H 57,730
U.S. Cl. 90—13.5    28 Claims
Int. Cl. B23c 1/16, 1/18; B23d 1/30

ABSTRACT OF THE DISCLOSURE

A control device for machine tools for moving a tool in correspondence with a contour surface of a cam or template includes a scanning element having a magnetizable roller engaged with the contour surface and rotated by an electric motor which is substantially coaxial with the roller. Magnetizing means establish a magnetic field including the roller and the cam contour surface to maintain the roller in engagement with the cam contact surface. The scanning element is mounted for universal angular displacement and controls fluid pressure actuated servo-mechanism for moving the tool relative to a workpiece. A manual control is provided, and the scanning element may be retracted to an inoperative position by electromagnetic means.

BACKGROUND OF THE INVENTION

This invention relates to control devices for machine tools and, more particularly, to a novel and improved control device for controlling the relative movement of a tool and a workpiece holder in correspondence with the contours of a cam or template.

Control devices providing for the transfer or copying of the contours, of a cam or template, on a workpiece are already known. The present invention is directed preferably to such control devices of the type in which hydraulic fluid under pressure operates, during scanning of the contours of a cam or template, hydraulic valve means to feed measured amounts of hydraulic fluid under pressure to hydraulic or pressure driving units controlling the displacements of a slide arrangement including a longitudinally displaceable slide and a cross slide displaceable transversely of the longitudinally displaceable slide.

Control devices of this type are generally provided with a support in which there is arranged a scanning element mounted for rotation and angular movement and moving along the cam or template contour by means of a control mechanism. The scanning element is held in constant contact with the cam or template contour and acts, due to deflection of the scanning element by the cam or template contour, and through a transfer device, on a servo-piston for the hydraulic means. This action is effected in two directions normal to each other, whereby the hydraulic fluid under pressure is distributed, in proportion to the amplitude and direction of deflection of the scanning element, through the hydraulic driving units.

A known control device of this type is shown in U.S. Patent No. 2,909,357, in which the control mechanism insuring the deflection of the scanning element is designed as a complicated unit reacting to pressure differences. This unit is independent of the control device proper and is expensive. This control mechanism acts in cooperation with deflecting means comprising pressure accumulators and fluid pressure operated pistons. In its operation, and in dependence on the resistance resulting from the curvature of the cam or template contour during movement of the scanning element, and which curvature acts on the scanning element, this control device operates to orient the scanning element by turning it about its axis in such a manner that the deflecting means always deflects the scanning element, in each phase of movement of the control device, from its neutral position in the direction of the cam or template contour in order to maintain movement of the control device. For this reason, the scanning element is designed as a longitudinal element mounted by a spherical bearing in the support. Responsive to deflecting means operating from the bearing, the scanning element responds to the slightest pressure or vibrations to move out of its neutral position.

An object of the present invention is to provide a novel and simplified control device for machine tools and which will act satisfactory even when subjected to relatively strong vibrations and shocks.

Another object of the invention is to provide a control device for machine tools including a template or cam contour scanning element driven by means of an electric driving motor forming the control mechanism.

A further object of the invention is to provide such a control device for machine tools, as just mentioned, in which the part cooperating with the contour of the cam or template comprises a magnetically adhering roller adhering to such contour under the action of a magnetic force produced by a magnet acting as a deflecting means.

In the arrangement of a control device according to the invention, the control mechanism thus takes over the function of moving the scanning element out of its neutral position, while the deflecting means merely serves to keep the adhering roller in contact with the contour of the cam or template. The rotation of the scanning element embodying the invention, and the rolling of the roller along the cam or template contour, necessarily effects the deflection required for actuating the servo-piston. This starts the driving units for driving the slide arrangements to be controlled. The adhering action of the magnetically adhering roller to the cam or template contour, attained in accordance with the invention, insures a reliable control of the parts even if the system is subjected to extremely strong vibrations and natural motions as may appear particularly, for example, in the nibbling of side plates and so forth. Thus, an absolutely satisfactory operation of the control device is insured with the simplest construction.

Yet another object of the invention is to provide a control device for machine tools as mentioned above, in which the scanning element and the driving motor are arranged in coaxial relation, with the motor preferably being arranged inside a support.

A further object of the invention is to provide a control device for machine tools including a coaxially arranged scanning element and driving motor and in which the scanning element is supported in a bearing box mounted rigidly with respect to the driving motor and which also carries the magnetic force providing magnet.

Yet another object of the invention is to provide a control device for machine tools, as just mentioned, in which the magnet producing the magnetic force includes an energizing winding designed at a toroidal winding and arranged coaxially with the scanning element and the driving motor, with the magnetic core being formed by the scanning element itself.

The valve means of the control device may be spaced angularly from each other and arranged, for example, to have their longitudinal extent extend normal to the axis of the scanning element and the driving motor. However, a more compact and self-contained construction can be obtained if the valve means, together with their servo-pistons, are arranged with their axes or longitudinal lines of operation parallel to the axis of the scanning element and driving motor, and preferably inside the support.

In order to provide, in a known manner, a double lever action of the scanning element to transmit angular movement thereof to two servo-pistons, a circumferential part in the form of a partial sphere can be secured on the servo-pistons and be supported in a corresponding bushing. However, a much more advantageous construction is possible if the deflection transmission means is in the form of a Cardan or universal joint.

Accordingly, another object of the invention is to provide a control device for machine tools of the type mentioned in which the angular movement or deflection of the scanning element is transmitted to the servo-mechanism by a universal or Cardan joint preferably positioned between the driving motor and the bearing box for the scanning element.

A further object of the invention is to provide a control device of the type mentioned in which the scanning element and the adhering roller are axially displaceable so that they can be lifted out of the scanning or working position into a free or retracted position.

A design of this type makes it possible to position the control device, without varying its spacing from the template or cam, into operative relation with different sections of the cam or template contour which are to be scanned successively. In particular, it permits the adjustable positioning of the adhering roller within the inner cuts of side plates, etc.

For positioning the control device, it is preferable to use a manual control mechanism and to design this manual control mechanism so that the adhering roller can be operated by the manual mechanism, either directly or indirectly, into its free or inoperative position.

Accordingly, a further object of the invention is to provide a control device for machine tools of the type mentioned and including a manual control mechanism having a hand control lever.

A further object of the invention is to provide such hand control lever with a switch means by means of which the scanning roller can be selectively moved into either the scanning or the free positions in an indirect manner.

In a preferred embodiment of the hand control mechanism, the switching means is a switch operating pin positioned in the hand control lever for axial displacement relative to the latter. By means of this pin, an electric operating mechanism can be energized to effect axial displacement of the scanning roller. Preferably, the device is designed so that the switch element will effect a rapid movement of the roller between its operative and inoperative positions, in order to lessen the time required for re-positioning the control device. The actuating mechanism for axial displacement of the roller can be an electro-magnet, although it is possible also to use a correspondingly designed permanent magnet. However, a much better design is obtained if a preferably ring-shape lifting magnet, arranged in the bearing box coaxially with the adhering magnet, is used as an actuating mechanism so that the adhering magnet can serve additionally as the means for resetting the scanning roller into the scanning position.

The hand control lever can be arranged on the support of the control device to be normal to the scanning element, for example. In order to effect a hydraulically controlled adjustment of the control device for positioning the same at different points, the servo-pistons can be actuated by respective double lifting magnets independently of the deflected position of the adhering roller. However, it is more advantageous to design the device so that the adjustment of the control device can be effected in any desired position by corresponding actuation of the hand-controlled lever.

To this end, and in accordance with the invention, the hand-controlled lever is arranged on the support coaxially with the adhering roller and the driving motor axis. The hand control lever is angularly movable and can be coupled with the structural unit formed by the adhering roller, the bearing box, the universal or Cardan joint and the driving motor for adjusting the control device. By corresponding deflection of the hand control lever, the entire unit can thus be moved out of its normal position with the adhering roller being always moved in the same direction in which the hand control lever is turned, due to the provision of the Cardan or universal joint and the placement of the hand control lever relative to the adhering or scanning roller. The control device will thus be moved in the direction into which the hand control lever is turned. In this design, the double magnets associated with the servo-pistons can then have an additional function, which is that of remote control of the servo-pistons during the positioning movement, the positioning movement being programmed or numerically controlled.

Yet another object of the invention is to provide a control device for the machine tools, of the type mentioned above, in which the structural unit including the adhering roller, the bearing box, the Cardan or universal joint and the driving motor on the one hand, and the hand control lever on the other hand, can be combined with an electric switch for energizing the lifting magnets so that, when the hand control lever is coupled with the structural unit, the adhering or scanning roller is axially displaced at the same time into its free position so that the control device may be moved freely relative to the template or cam.

Such switch can also actuate, at the same time, a control element for initiating the rapid return motion.

For an understanding of the principles of the invention, reference is made to the following description of a typical embodiment thereof as illustrated in the accompanying drawings.

Figure 1:
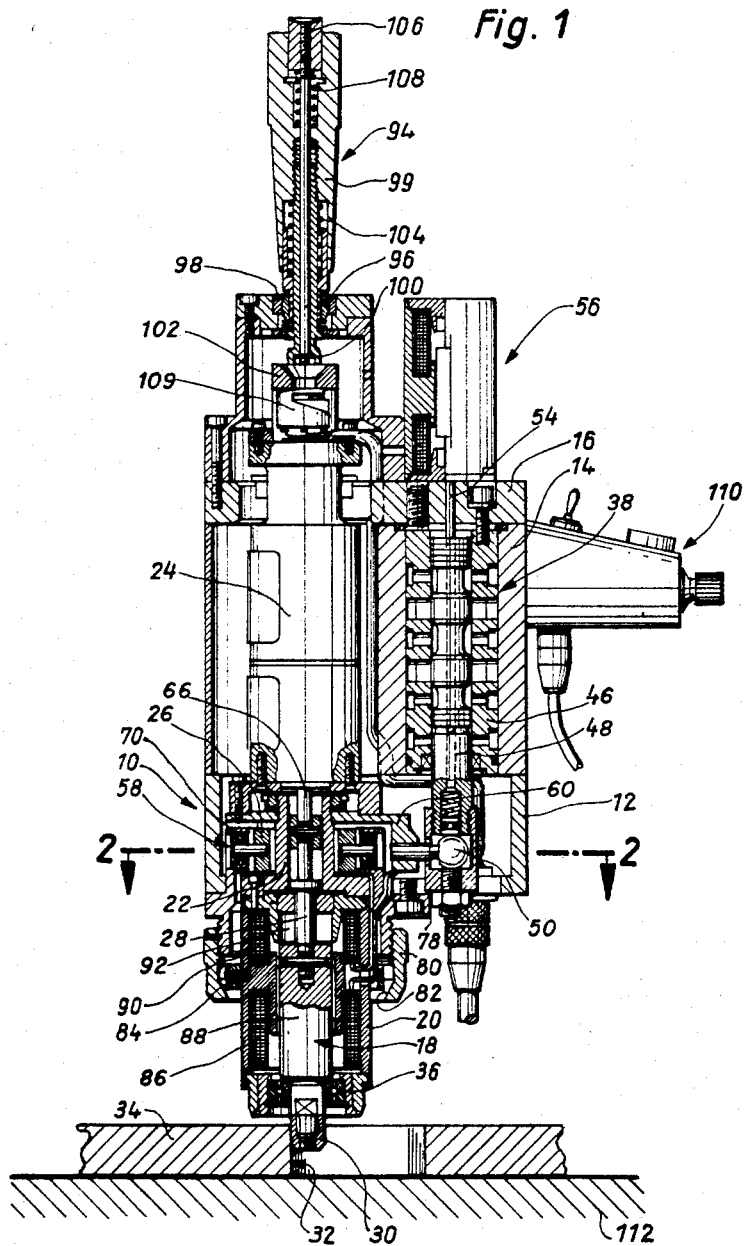
FIG. 1 is a longitudinal sectional view through the control device.
Figure 2:
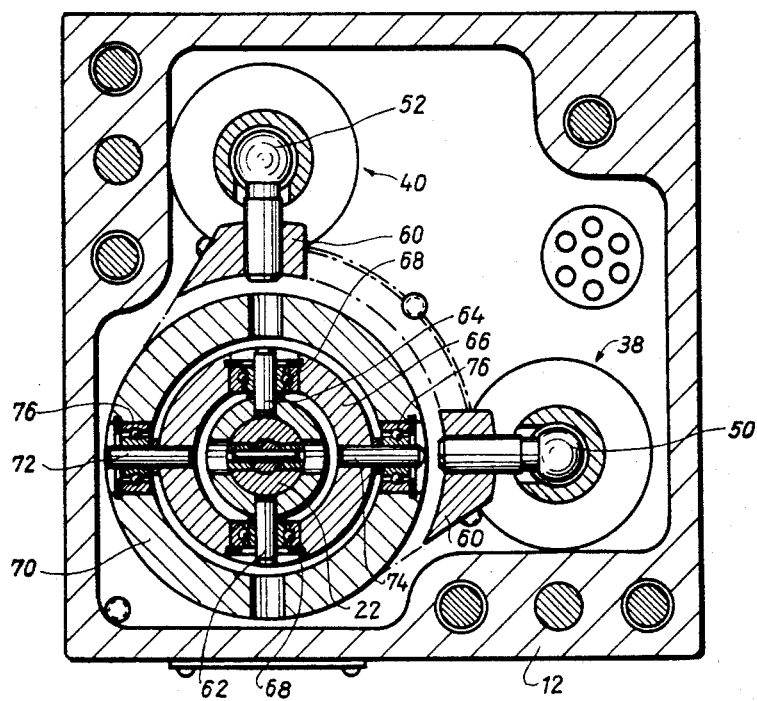
FIG. 2 is a transverse sectional view taken on the line 2—2 of FIG. 1 and on a larger scale than FIG. 1.

Referring more particularly to FIGS. 1 and 2, a support 10 forms the housing of the control device embodying the invention. This support has a lower part 12, a control part 14, and an upper part 16. In the lower part 12 of support 10, there is rotatably mounted the scanning element 18 which is rotatably arranged in a bearing box 20. Bearing box 20 is rigidly connected with an electric driving motor 24 arranged in support 10, by means of sleeve-shaped intermediate element or piece 22. The driving shaft 26 of motor 24 is coupled, by means of a transmission shaft 28 arranged for axial movement in intermediate piece 22, with scanning element 18 which is likewise arranged for axial displacement in bearing box 20.

The scanning element 18 has a part projecting from bearing box 20 and carrying an adhering roller 30 which scans the contour or cam surface 32 on the template or cam 34. The scanning element is designed as a shaft which is mounted for axial displacement in a ball bearing 36 at the bottom end of bearing box 20.

Scanning element 18 actuates two servo-valve means 38 and 40 arranged in support 10 at positions spaced apart by an angular distance of 90° relative to the axis of driving motor 24. These valves distribute, in a known manner, pressure or hydraulic fluid proportional to the amplitude and direction of deflection of the scanning element, by means of hydraulic driving units such as, for example, oil motors 42 and 44 (see FIG. 3). For this purpose, each mechanism includes a servo-piston 48 which is displaceably guided in the control bushes 46 of the valve means and whose actuation is effected over ball-headed pins 50 and 52 controlled by the scanning element. The method of operation of these valves is known per se, and thus it is believed not necessary to describe the same in detail.

In accordance with the invention, both valve means 38 and 40 are arranged with their longitudinal axes extending parallel to the axis of driving motor 24 in support 10, so that a compact self-contained arrangement is obtained. Each servo-piston 48 is connected by a connecting rod 54 with a respective double lifting magnet 56. The function of lifting magnets 56 will be discussed more fully hereinafter.

The angular mobility necessary for actuating servo-pistons 48 by scanning element 18 is provided by means of a Cardan or universal joint 58 positioned between bearing box 20 and driving motor 24, and intermediate piece 22 forms part of this Cardan or universal joint. As best seen in FIG. 1, intermediate piece 22 is connected, at its uuper end, with a disk 60 of the Cardan joint carrying the ball pins 50 and 52. Disk 60, in turn, is rigidly connected with the housing of motor 24. Intermediate piece 22 is pivotally mounted, through the medium of bearing pins 62 and 64, in a central Cardan ring 66, with the interposition of ball bearings 68. Central ring 66 is mounted, in a known manner, to pivot about an axis which is perpendicular to the pivot axis of intermediate piece 22, ring 66 being thus pivotally mounted in an outer Cardan ring 70 by means of bearing pins 72 and 74, with the interposition of ball bearings 76. Outer ring 70 forms a part of the lower part 12 of housing 10, since it is secured by means of a flange 78 on the underside of this lower housing part. A cap nut 80 is secured on outer stationary Cardan ring 70, and a stop ring 84 is secured on bearing box 20 and is arranged inside cap nut 80 and cooperates with the conical inner surface 82 thereof to limit deflection of scanning element 18.

In accordance with the invention, the course of the scanning movement of the control device and the movement of the adhering roller 30 along the contours or cam surfaces of the cam or template 34 are effected by magnetic force. To this end, an annular magnet energizing coil 86 is arranged in bearing box 20 and coaxially surrounds the part of scanning element 18 extending through this coil and serving as a magnet core 88. As soon as coil 86 is energized, a magnetic force is produced between the cam or template and the roller 30, so that the latter is pulled toward the cam surface of the cam or template.

When driving motor 24 is started, roller 30 rotates while the housing and support 10 remain motionless at this time. This rotation of roller 30, in which it is pulled at the same time toward cam surface 32, effects a deflection of scanning element 18. Thus, valve means 38 and 40 are actuated through Cardan disk 60 and ball pins 50 and 52, respectively, so that hydraulic fluid under pressure is fed, in a known manner and in measured amounts, to hydraulic driving units to control relative motion of the tool and the tool holder.

As can best be seen in FIG. 1, an additional annular magnet energizing coil 90 is arranged in axially spaced relation to annular magnet energizing coil 60 and coaxially with drive shaft 26 and scanning element 18. Scanning element 18 projects partly into the space enclosed by annular coil 90. If coil 90 is energized, element 18 including the magnet core 80 is pulled into the space 92, so that scanning roller 30 is moved from its scanning position into a free retracted inoperative position. The invention control device can then be moved freely over the template or cam without shifting it in a vertical direction, and it is also possible to introduce roller 30 into inner cuts of templates or cams.

In accordance with the invention, the control device is so designed that it can be operated manually to follow cam or template surfaces and also to be brought manually to any point of the surface to be scanned. For this purpose, a hand control lever 94 is arranged coaxially with drive shaft 26 and the axis of roller 30. This lever 34 is provided on the upper housing part 16, and is mounted for angular movement by means of a ball end 96 in a corresponding spherical bushing 98. Hand control lever 94 can be coupled with a deflection system, formed by driving motor 24, Cardan joint 58 and bearing box 20, by means of an axially movable sleeve 99 acting as a handle, and this sleeve is provided with a ball pin 100 projecting into the interior of the housing. Ball pin 100 can be introduced into a receiving head 102 of driving motor 24 when sleeve 99 is shifted axially inwardly. This provides an articulated joint with the deflection system whenever handle 94 is angularly displaced.

Sleeve 99 is held in ready position by a compression spring 94 and, in this ready position, ball pin 100 is out of engagement with receiving head 102. An operating plunger 106 is guided for axial displacement in handle 99 and is under the bias of spring 108. Plunger 106 extends through ball pin 100 and associated therewith is a limit switch 109 positioned in receiving head 102. Switch 109 energizes or excites annular coil 90 when plunger 106 is pressed inwardly, so that roller 30 is retracted into its free position.

Preferably, the limit switch simultaneously effects a switching from the working position to quick motion, so that the control device can be steered by means of the hand control lever 94 in a rapid motion to different points to be scanned. Due to the arrangement of the Cardan joint, the deflection of the deflection system, effected by movement of hand control lever 94 during the cooperation of ball pin 100 with receiving head 102, is reversed, so that a unidirectional deflection of hand control lever 94 and roller 30 is achieved. Thereby, the movement of the control device in the direction in which the hand control lever is inclined is assured.

The arrangement of double lifting magnets 56 on the individual valve means provides for remote control of the servo-piston for positioning movements of the device, programmed or numerically controlled positioning being possible, for example.

A control desk or panel 110 is provided on support 10, and carries switching and indicating elements for the annular coils 86 and 90 as well as control means for controlling the direction and speed of rotation of motor 24.

Figure 3:
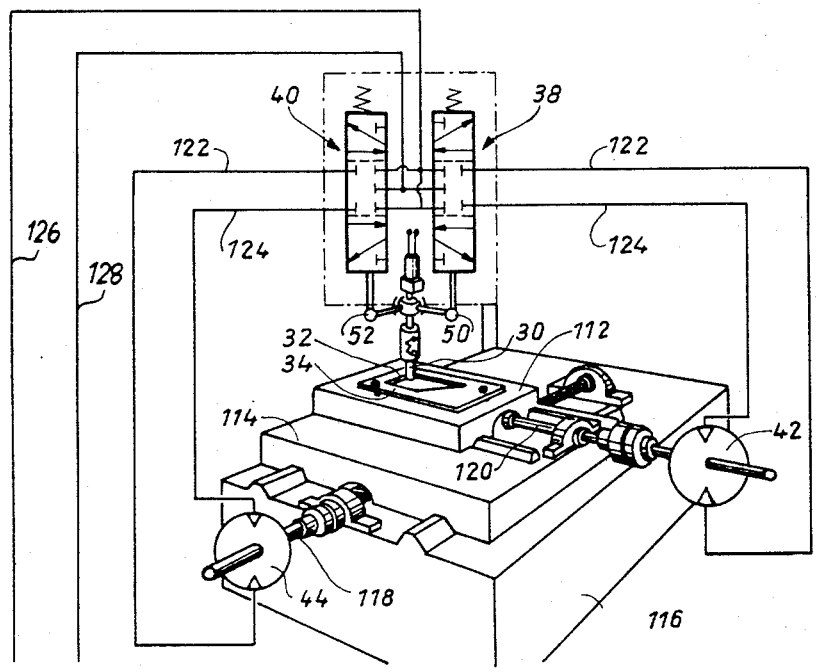
FIG. 3 is a schematic representation of a control device embodying the invention in association with a slide arrangement to be controlled, and illustrating that part of the slide arrangement which carries the template or cam to be scanned.

FIG. 3 schematically illustrates the control device of the invention in association with a cam or template 34. The cam or template is secured on the holding slide 112 which is guided for displacement longitudinally of itself on a carrier slide 114. Slide 114 is guided for displacement longitudinally of a machine bed 116. Slides 112 and 114 are adjustable in mutually perpendicular directions by spindles 118 and 120 driven by oil motors 42 and 44. These spindles cooperate, for example simultaneously and through means which have not been illustrated, with a slide arrangement of the same design, either a head stock with a working spindle being arranged on a corresponding holding slide or a workpiece being secured thereon. In the former case, a stationary workpiece is associated with the tools secured in the working spindle while, in the latter case, a stationary rotating tool is associated with the workpiece. In the illustrated embodiment of the invention, the cam surface is formed by a template, and cam surface 32 is an inner cut. The control device must thus be able to provide movement through 360° to scan surface 32.

Pressure fluid, supplied from a hydraulic unit through lines 126 and 128, is fed in measured amounts to hydraulic drives 42 and 44 through lines 122 and 124 leading from valve means 38 to 40, to effect operation of drives 42 and 44 in correspondence with deflection and displacement of the piston valves from the neutral position. This operation is effected in such a way that the drive of the slide arrangement 112, 114 which is effected thereby is proportional to the amplitude and direction of deflection of scanning roller 30. Thus, an exact copy of the contour followed by the control device and of the scanned cam surface can be obtained on the controlled tool or workpiece.

While a specific embodiment of the invention has been shown and described in detail to illustrate the application of the principles of the invention, it will be understood that the invention may be embodied otherwise without departing from such principles.

What is claimed is:

1. In a control device for machine tools, for controlling the relative motion of a tool and a workpiece holder in accordance with a contour surface of a cam or template, and of the type including a scanning element cooperable with the contour surface, a support mounting the scanning element for rotation and angular displacement, control mechanism operable to move the scanning element along the contour surface, deflecting means maintaining the scanning element constantly engaged with the contour surface, servo-mechanism controlling driving mechanism operable to effect such relative displacement of the tool and workpiece in two mutually perpendicular directions, and transmission means connecting the deflecting means in controlling relation to the servo-mechanism and operable to control the latter to effect operation of the driving mechanism in accordance with the amplitude and direction of deflection of the scanning element by the contour surface: the improvement in which the scanning element comprises a magnetizable roller, and the deflecting means comprises magnetizing means establishing a magnetic field including said roller and the contour surface.

2. In a control device for machine tools, the improvement claimed in claim 1, in which the control mechanism comprises an electric motor rotating said roller.

3. In a control device for machine tools, the improvement claimed in claim 2, in which said magnetizing means comprises an electro-magnet.

4. In a control device for machine tools, the improvement claimed in claim 2, in which said motor is arranged coaxially with said roller.

5. In a control device for machine tools, the improvement claimed in claim 4, in which said motor is mounted inside the support.

6. In a control device for machine tools, the improvement claimed in claim 3, including a bearing box rigidly secured to said motor; said bearing box having said electro-magnet mounted therein and also rotatably mounting said scanning element.

7. In a control device for machine tools, the improvement claimed in claim 6, in which said electro-magnet includes an annular magnetizing winding coaxial with the scanning element.

8. In a control device for machine tools, the improvement claimed in claim 2, in which said servo-mechanism includes a pair of servo-valves each including a servo-piston operating in a servo-cylinder; the axes of said servo-valves extending parallel to the axis of said electric motor.

9. In a control device for machine tools, the improvement claimed in claim 8, in which said servo-valves are mounted within the support.

10. In a control device for machine tools, the improvement claimed in claim 8, in which said transmission means comprises a Cardan joint transmitting angular movement of the scanning element to said servo-pistons.

11. In a control device for machine tools, the improvement claimed in claim 10, including a bearing box rigidly secured to said electric motor and rotatably mounting said scanning element; and in which said Cardan joint is positioned between said electric motor and said bearing box.

12. In a control device for machine tools, the improvement claimed in claim 1, in which the scanning element, including said roller, is axially displaceable in said support for movement of said roller between a scanning position and a retracted inoperative position in which the control device may be freely moved relative to the cam or template.

13. In a control device for machine tools, the improvement claimed in claim 6, in which the scanning element, including said roller, is mounted for axial displacement relative to said bearing box, to move said roller between a scanning position and a retracted inoperative position in which said control device can be moved freely relative to the cam or template.

14. In a control device for machine tools, the improvement claimed in claim 13, including manual control mechanism for positioning the control device relative to the cam or template; and means operatively associating said manual control mechanism and said roller for movement of said roller between its scanning position and its retracted inoperative position.

15. In a control device for machine tools, the improvement claimed in claim 14, in which said manual control mechanism includes a manual control lever; electric switch means operable by said control lever; and electrically energized means controlled by said switch means and operatively associated with said roller to move the latter between its scanning position and its retracted inoperative position.

16. In a control device for machine tools, the improvement claimed in claim 15, in which said switch means comprises a plunger mounted in said manual control lever for displacement longitudinally of the latter, and a switch operated by such longitudinal displacement of said plunger.

17. In a control device for machine tools, the improvement claimed in claim 16, in which said switch effects a changeover in the rate of axial adjustment of said roller from a working speed to a relatively high speed.

18. In a control device for machine tools, the improvement claimed in claim 16, in which said electrically energized means comprises at least one electro-magnet.

19. In a control device for machine tools, the improvement claimed in claim 16, in which said electrically energized means includes said electro-magnet.

20. In a control device for machine tools, the improvement claimed in claim 18, in which said electro-magnets include an annular magnetizing winding mounted in said bearing box and in coaxial relation with the magnetizing winding of said first mentioned electro-magnet and cooperable with a magnetic core included in said scanning element.

21. In a control device for machine tools, the improvement claimed in claim 20, in which said first mentioned electro-magnet, when energized, is operable to move said roller to its scanning position.

22. In a control device for machine tools, the improvement claimed in claim 14, in which said electric motor is coaxial with said roller, said manual control lever being aligned with the common axis of said electric motor and said roller.

23. In a control device for machine tools, the improvement claimed in claim 22, in which said transmission means includes a Cardan joint mounting said control mechanism in the support; means mounting said manual control lever in the support for universal adjustment relative thereto; the inner end of said manual control lever being normally disconnected from said electric motor; and coupling means selectively operable to couple the inner end of said manual control lever to said electric motor for manual control of said roller, said bearing box, said Cardan joint and said electric motor.

24. In a control device for machine tools, the improvement claimed in claim 23, in which said coupling means is combined with said switch means; said electrically energizing means comprising said first mentioned electro-magnet and a second electro-magnet coaxial with said first mentioned electro-magnet and positioned in said bearing box.

25. In a control device for machine tools, the improvement claimed in claim 8, in which the control edges of said servo-pistons are chamfered.

26. In a control device for machine tools, the improvement claimed in claim 8, including respective double acting electro-magnet means each operatively associated with a respective servo-piston and selectively operable to actuate the associated servo-piston independently of the deflecting position of said roller.

27. In a control device for machine tools, the improvement claimed in claim 1, in which the peripheral surface of said roller is roughened.

28. In a control device for machine tools, the improvement claimed in claim 2, including regulating means operable to vary the speed of said electric motor to vary the peripheral speed of said roller; said electric motor being a reversible electric motor.

References Cited

UNITED STATES PATENTS 3,286,599  11/1966  Evans _____ 90—62

GERALD A. DOST, *Primary Examiner.*

U.S. Cl. X.R.

90—62; 106—39; 252—62.9, 63.5